US012784295B2

(12) United States Patent
Kaku et al.

(10) Patent No.: US 12,784,295 B2
(45) Date of Patent: Nov. 3, 2026

(54) IMAGE GENERATION METHOD AND SYSTEM

(71) Applicant: TOYOTA JIDOSHA KABUSHIKI KAISHA, Aichi-ken (JP)

(72) Inventors: Wataru Kaku, Musashino (JP); Takahiro Kataoka, Yokohama (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 18/896,903

(22) Filed: Sep. 26, 2024

(65) Prior Publication Data

US 2025/0139843 A1 May 1, 2025

(30) Foreign Application Priority Data

Oct. 10, 2023 (JP) ................................ 2023-175461

(51) Int. Cl.

*G06T 11/00* (2026.01)
*G06F 3/01* (2006.01)
*G06T 7/70* (2017.01)

(52) U.S. Cl.

CPC .............. *G06T 11/00* (2013.01); *G06F 3/013* (2013.01); *G06T 7/70* (2017.01); *G06T 2207/30201* (2013.01)

(58) Field of Classification Search

None

See application file for complete search history.

(56) References Cited

U.S. PATENT DOCUMENTS

| | | | | |
|---|---|---|---|---|
| 8,625,844 B2 * | 1/2014 | Chen | G06F 3/011 463/36 |
| 2015/0237079 A1 | 8/2015 | Hirata | |
| 2019/0110023 A1 | 4/2019 | Sakai et al. | |
| 2023/0281885 A1 * | 9/2023 | Park | G06V 10/94 345/156 |
| 2024/0005622 A1 * | 1/2024 | Lee | G06F 3/013 |

FOREIGN PATENT DOCUMENTS

| | | |
|---|---|---|
| JP | H09224228 A | 8/1997 |
| JP | 2001-016563 A | 1/2001 |
| JP | 2001-136501 A | 5/2001 |
| JP | 2006-139028 A | 6/2006 |
| JP | 2014090230 A | 5/2014 |
| JP | 2020136921 A | 8/2020 |
| JP | 6950685 B2 | 10/2021 |
| WO | 2021/261188 A1 | 12/2021 |

* cited by examiner

*Primary Examiner* — Nicholas J Lee

(74) *Attorney, Agent, or Firm* — HAUPTMAN HAM, LLP

(57) ABSTRACT

An image generation method includes generating, by a second terminal apparatus, in a case in which it is determined by a first terminal apparatus that the gaze of a first user is directed toward a displayed model image of a second user, a model image of the first user based on a captured image of the first user received from the first terminal apparatus. The image generation method includes generating, by the second terminal apparatus, in a case in which it is determined by the first terminal apparatus that the gaze of the first user is not directed toward the displayed model image of the second user, a model image of the first user based on data of the first user acquired in advance.

20 Claims, 6 Drawing Sheets

IMAGE GENERATION METHOD AND SYSTEM

CROSS-REFERENCE TO RELATED APPLICATION

This application claims priority to Japanese Patent Application No. 2023-175461 filed on Oct. 10, 2023, the entire contents of which are incorporated herein by reference.

TECHNICAL FIELD

The present disclosure relates to an image generation method and a system.

BACKGROUND

Technology for displaying avatars on terminal apparatus to represent other users is known. For such technology to provide realistic communication, technology for pasting real facial video of other users onto the avatars and then displaying the avatars is known. See Patent Literature (PTL) 1.

CITATION LIST

Patent Literature

PTL 1: JP 2001-16563 A

SUMMARY

With conventional technology, it is necessary to keep receiving data of other users' real facial video from the other terminal apparatuses in order to continuously paste the other users' real facial video on their avatars and display the avatars. If the system continues to receive the data of the other users' real facial video, the amount of communication between terminal apparatus will increase and communication speed will decrease. When communication speed decreases, users cannot have realistic, smooth communication with each other.

It would be helpful to provide realistic communication while suppressing a reduction in communication speed.

An image generation method according to an embodiment of the present disclosure is an image generation method to be executed by a first terminal apparatus and a second terminal apparatus, the image generation method including:

- displaying, by the first terminal apparatus, a model image of a second user of the second terminal apparatus and determining whether a gaze of a first user of the first terminal apparatus is directed toward the displayed model image of the second user;
- generating, by the second terminal apparatus, in a case in which it is determined by the first terminal apparatus that the gaze of the first user is directed toward the displayed model image of the second user, a model image of the first user based on a captured image of the first user received from the first terminal apparatus; and
- generating, by the second terminal apparatus, in a case in which it is determined by the first terminal apparatus that the gaze of the first user is not directed toward the displayed model image of the second user, a model image of the first user based on data of the first user acquired in advance.

A system according to an embodiment of the present disclosure includes:

- a first terminal apparatus and a second terminal apparatus, wherein
- the first terminal apparatus is configured to display a model image of a second user of the second terminal apparatus and determine whether a gaze of a first user of the first terminal apparatus is directed toward the displayed model image of the second user,
- the second terminal apparatus is configured to generate, in a case in which it is determined by the first terminal apparatus that the gaze of the first user is directed toward the displayed model image of the second user, a model image of the first user based on a captured image of the first user received from the first terminal apparatus, and
- the second terminal apparatus is configured to generate, in a case in which it is determined by the first terminal apparatus that the gaze of the first user is not directed toward the displayed model image of the second user, a model image of the first user based on data of the first user acquired in advance.

According to an embodiment of the present disclosure, realistic communication can be provided while a reduction in communication speed is suppressed.

DETAILED DESCRIPTION

An embodiment of the present disclosure will be described below, with reference to the drawings.

Figure 1:
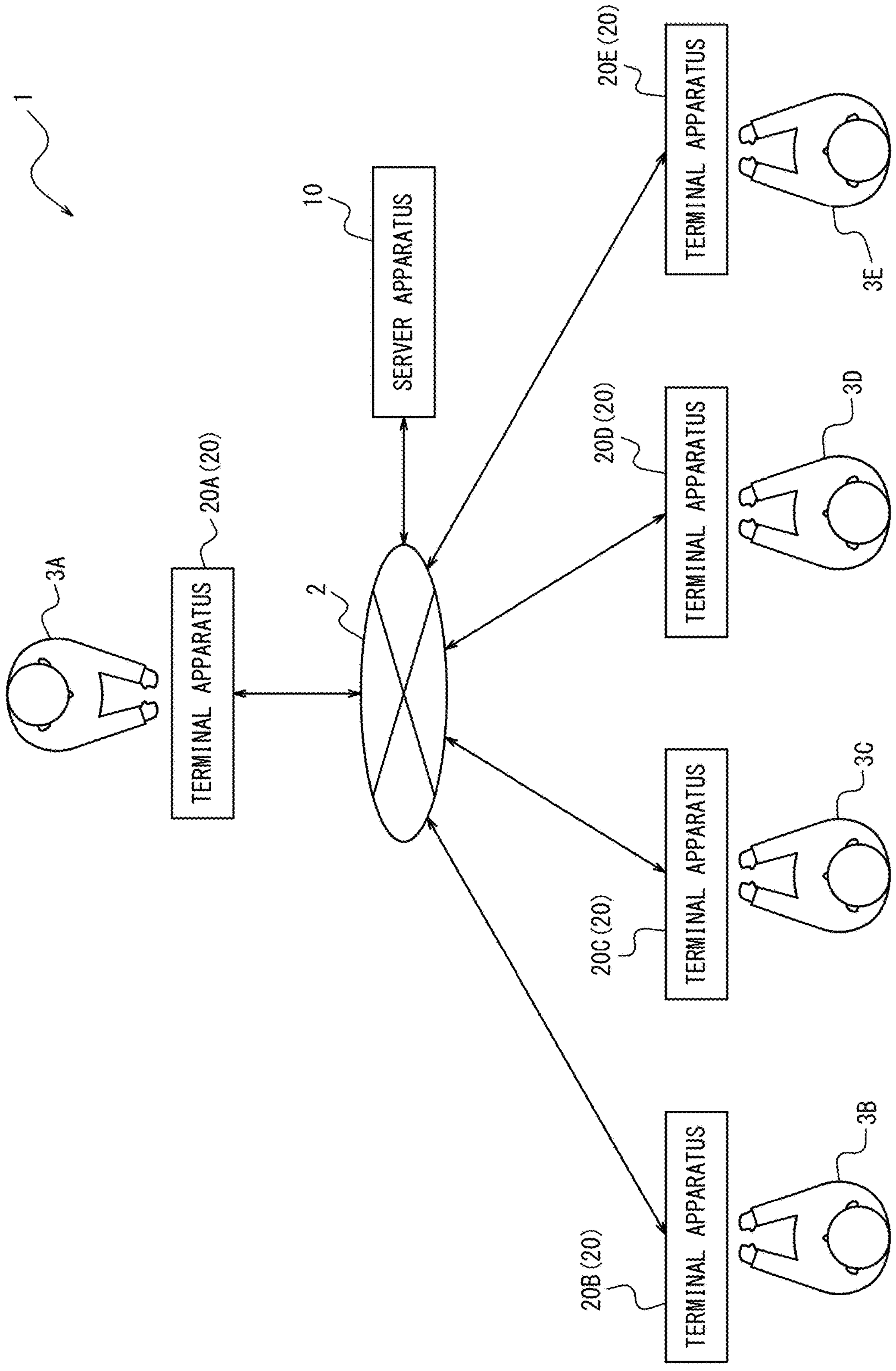
FIG. 1 is a diagram illustrating a schematic configuration of a system according to an embodiment of the present disclosure.

As illustrated in FIG. 1, a system 1 according to the present embodiment includes a server apparatus 10 and terminal apparatus 20A, 20B, 20C, 20D, 20E. Hereinafter, the terminal apparatuses 20A through 20E are also described as the "terminal apparatus 20" unless particularly distinguished. The system 1 includes five terminal apparatuses 20. However, the system 1 only needs to include at least two terminal apparatuses 20.

The system 1 is a system for providing events that can be attended using the terminal apparatuses 20. An event is, for example, an online class.

The server apparatus 10 and the terminal apparatuses 20 can communicate via a network 2. The network 2 may be any network including a mobile communication network, the Internet, or the like.

The server apparatus 10 transmits and receives, and performs information processing on, information necessary to provide an event. For example, the server apparatus 10 relays communications between a plurality of terminal apparatuses 20 during the implementation of an event.

The server apparatus 10 is, for example, a dedicated computer configured to function as a server, a general purpose personal computer, a cloud computing system, or the like.

Each of the terminal apparatuses 20 is, for example, a terminal apparatus such as a desktop personal computer (PC), a tablet PC, a notebook PC, or a smartphone.

Figure 2:
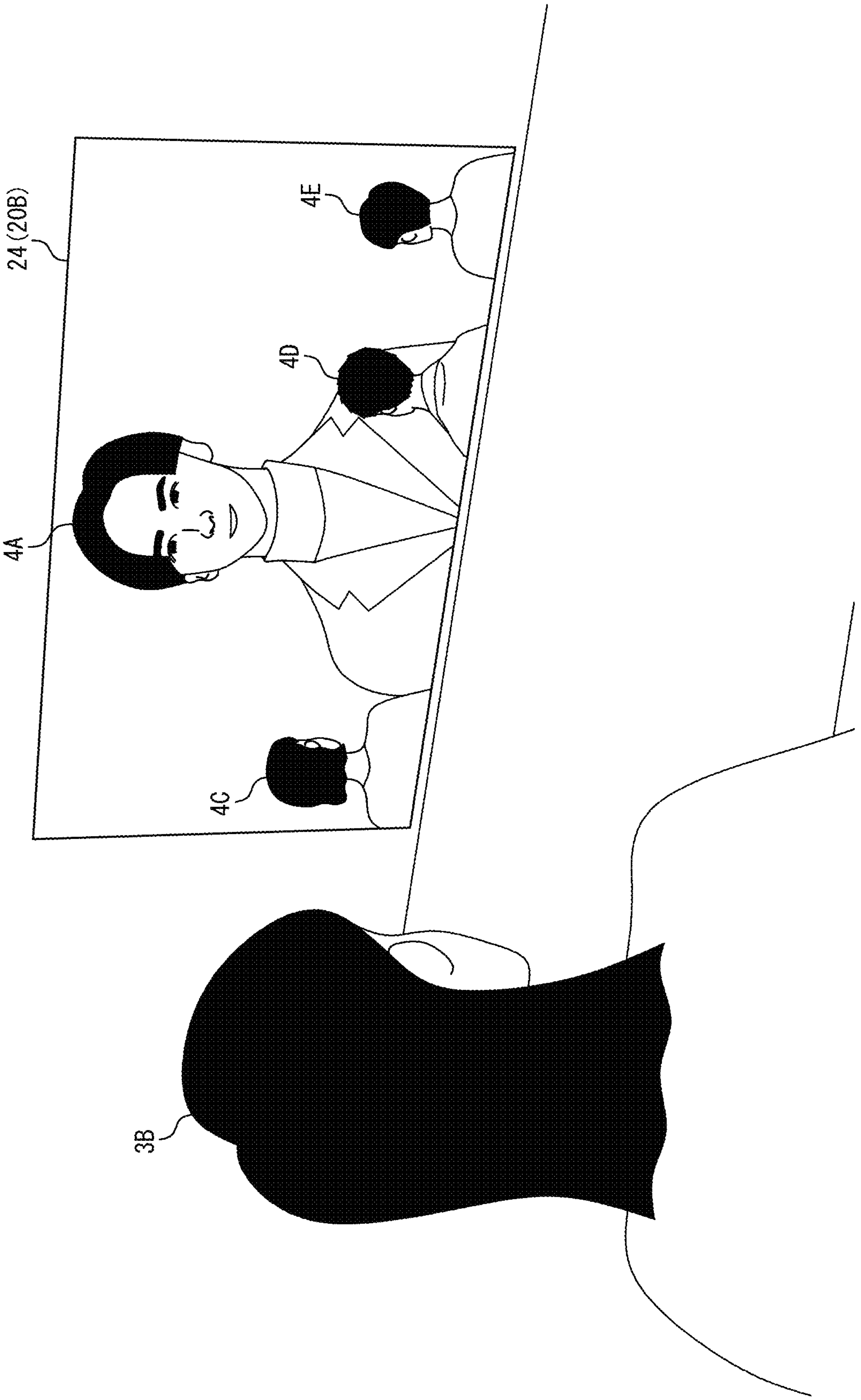
FIG. 2 is a diagram illustrating an example of the appearance of an event.

The terminal apparatuses 20A, 20B, 20C, 20D, 20E are used by users 3A, 3B, 3C, 3D, 3E, respectively. The users 3A to 3E use the terminal apparatuses 20A to 20E respectively to participate in an event. For example, in FIG. 2, the user 3B is illustrated using the terminal apparatus 20B to participate in an event. Model images 4A, 4C, 4D, 4E are displayed on the terminal apparatus 20B. The model images 4A, 4C, 4D, 4E are model images of the users 3A, 3C, 3D, 3E, respectively. Here, in the event, any one of the users 3A to 3E is a fixed user. A fixed user is a user for whom the display position of the model image is fixed. For example, the teacher, or a student who is speaking, in an online class is a fixed user. In FIG. 2, the user 3A is a fixed user. The display position of the model image 4A of the user 3A is therefore fixed. The model image of the fixed user is fixed at the center position of the display 24, for example. The model images of other users are placed around the model image of the fixed user. The model images of other users are placed so that their gaze is directed toward the model image of the fixed user. The model image of the fixed user may be displayed larger than model images of other users. The model image of the user may be an image that includes at least the user's head. By inclusion of the user's head in the model image of the user, a plurality of users can communicate while recognizing each other's facial expressions. The model image of the user may be an image that further includes the user's neck and the user's upper body in addition to the user's head.

Any two of the terminal apparatus 20A to 20E transmit and receive a captured image of the user to generate and display a model image of the user. The two terminal apparatuses 20 that transmit and receive the captured image of the user are described as a “first terminal apparatus” and a “second terminal apparatus”. The user of the first terminal apparatus is described as the “first user”. The user of the second terminal apparatus is described as the “second user”. The first terminal apparatus generates a model image of the second user and displays the generated model image of the second user. The second terminal apparatus generates a model image of the first user and displays the generated model image of the first user.

Here, upon displaying the model image of the second user, the first terminal apparatus determines whether the gaze of the first user is directed toward the displayed model image of the second user. For example, assume that in FIG. 2, the terminal apparatus 20B is the first terminal apparatus, the user 3B is the first user, and the model image of the second user is the model image 4C of the user 3C. In this case, the terminal apparatus 20B determines whether the gaze of the user 3B is directed toward the model image 4C.

Figure 3:
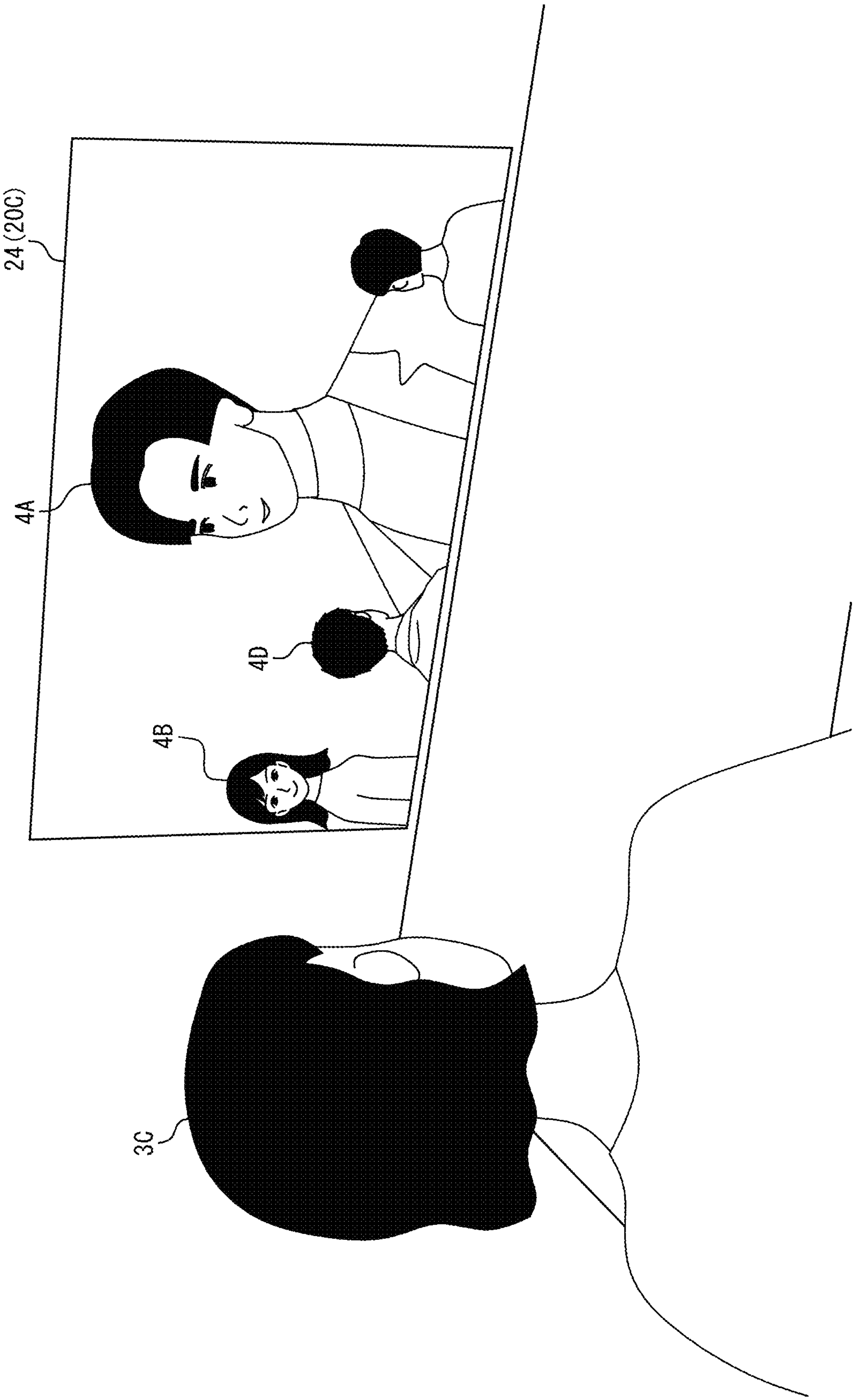
FIG. 3 is a diagram illustrating an example of the appearance of an event.

The first terminal apparatus transmits data of the captured image of the first user to the second terminal apparatus in a case in which it is determined that the gaze of the first user is directed toward the displayed model image of the second user. For example, in FIG. 2, in a case in which it is determined that the gaze of the user 3B, who is the first user, is directed toward the model image 4C of the second user, then the terminal apparatus 20B, which is the first terminal apparatus, transmits data of a captured image of the user 3B to the terminal apparatus 20C, which is the second terminal apparatus. In this case, the terminal apparatus 20C receives the data of the captured image of the user 3B. The terminal apparatus 20C, which is the second terminal apparatus, generates and displays the model image 4B of the user 3B based on the received captured image of the user 3B, as illustrated in FIG. 3. In a case in which the gaze of the user 3B, who is the first user, is directed toward the model image 4C in FIG. 2, then the model image 4B of the user 3B, who is the first user, is an image in which the displayed face is facing the user 3C, who is the second user, as illustrated in FIG. 3. The display of such a model image of the first user on the second terminal apparatus can provide realistic communication.

The first terminal apparatus does not transmit data of the captured image of the first user to the second terminal apparatus in a case in which it is determined that the gaze of the first user is not directed toward the displayed model image of the second user. For example, in FIG. 2, in a case in which it is determined that the gaze of the user 3B is not directed toward the model image 4C of the second user, then the terminal apparatus 20B, which is the first terminal apparatus, does not transmit data of a captured image of the user 3B to the terminal apparatus 20C, which is the second terminal apparatus. In this case, the terminal apparatus 20C generates a model image of the user 3B, who is the first user, based on data of the user 3B acquired in advance. The data of the user 3B acquired in advance is, for example, data of a captured image of the user 3B received in advance. The terminal apparatus 20C generates an image of the back of the user's head or the side of the user's face as the model image of the user 3B, as described below. Here, in a case in which the gaze of the user 3B is not directed toward the model image 4C, the user 3B and the user 3C are not communicating. Therefore, displaying an image of the back of the head of the user 3B or the like does not interfere with communication between the users 3B and 3C. Images of the back of the user's head or the like are also generally less complex than images of the user's face. Therefore, images of the back of the user's head or the like can easily be created based on data of the captured image of the user received in advance. Furthermore, by the captured image of the first user not being transmitted to the second terminal apparatus, the amount of communication between terminal apparatuses 20 can be reduced.

(Configuration of Server Apparatus)

Figure 4:
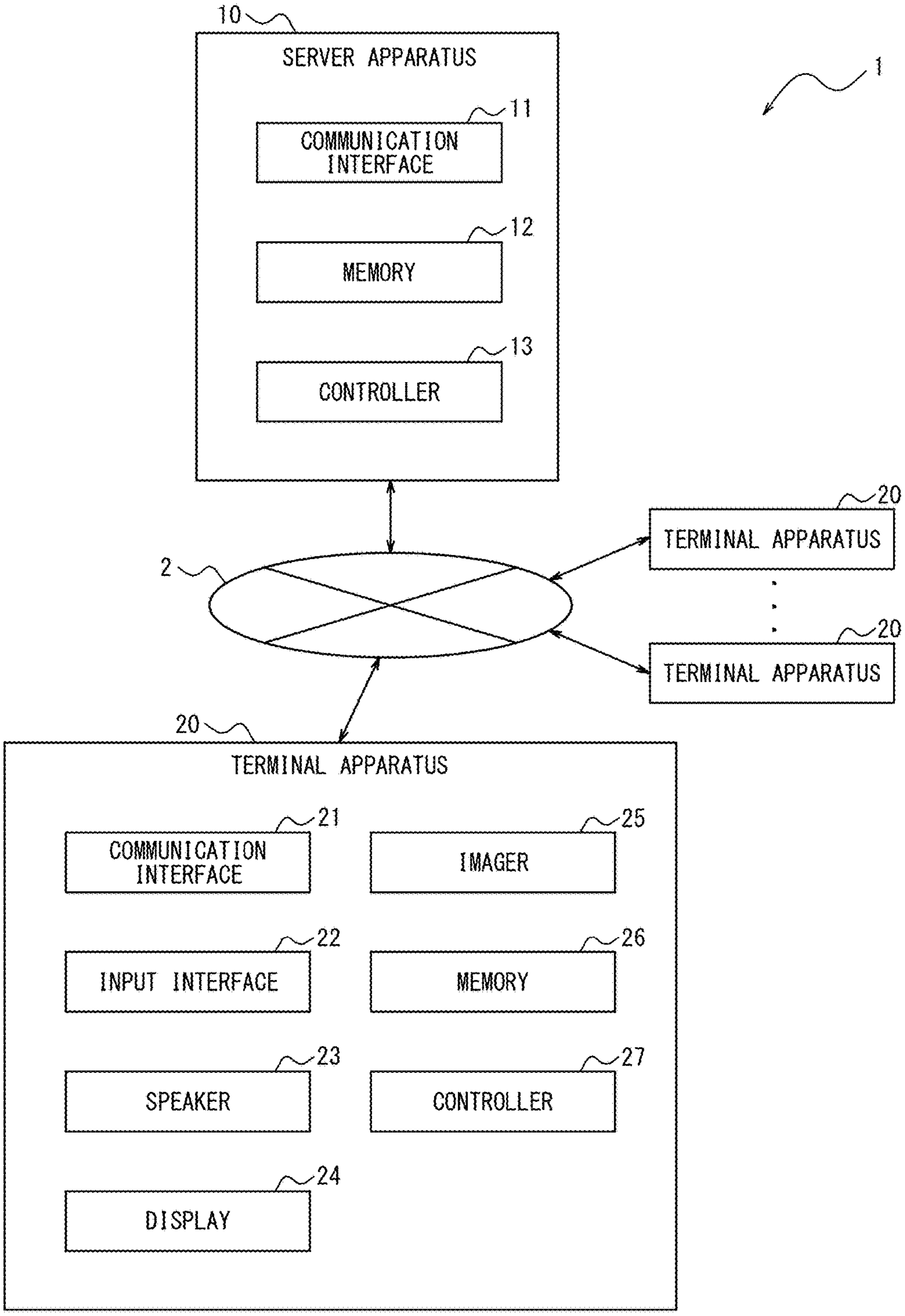
FIG. 4 is a block diagram of the system illustrated in FIG. 1.

As illustrated in FIG. 4, the server apparatus 10 includes a communication interface 11, a memory 12, and a controller 13.

The communication interface 11 is configured to include at least one communication module for connection to the network 2. For example, the communication module is a communication module compliant with a standard such as a wired Local Area Network (LAN) or a wireless LAN. The communication interface 11 is connectable to the network 2 via a wired LAN or a wireless LAN using the communication module.

The memory 12 is configured to include at least one semiconductor memory, at least one magnetic memory, at least one optical memory, or a combination of at least two of these. The semiconductor memory is, for example, random access memory (RAM) or read only memory (ROM). The RAM is, for example, static random access memory (SRAM), dynamic random access memory (DRAM), or the like. The ROM is, for example, Electrically Erasable Programmable Read Only Memory (EEPROM) or the like. The memory 12 may function as a main memory, an auxiliary memory, or a cache memory. The memory 12 stores data to be used for operations of the server apparatus 10 and data obtained by the operations of the server apparatus 10.

The controller 13 is configured to include at least one processor, at least one dedicated circuit, or a combination thereof. Examples of the processor include a general purpose processor such as a CPU or a graphics processing unit (GPU) and a dedicated processor dedicated to specific processing. Examples of dedicated circuits can include a Field-Programmable Gate Array (FPGA) and an Application Specific Integrated Circuit (ASIC). The controller 13 executes processes related to operations of the server apparatus 10 while controlling components of the server apparatus 10.

(Configuration of Terminal Apparatus)

As illustrated in FIG. 4, the terminal apparatus 20 includes a communication interface 21, an input interface 22, a speaker 23, a display 24, an imager 25, a memory 26, and a controller 27.

The communication interface 21 is configured to include at least one communication module for connection to the network 2. The communication module is, for example, a communication module compliant with a standard such as a wired LAN standard or a wireless LAN standard, or a mobile communication standard such as the Long Term Evolution (LTE) standard, the 4th Generation (4G) standard, or the 5th Generation (5G) standard.

The input interface 22 is capable of accepting an input from a user. The input interface 22 is configured to include at least one interface for input that is capable of accepting the input from the user. The interface for input is, for example, a physical key, a capacitive key, a pointing device, a touch screen integrally provided with the display of the display 24, a microphone, or the like.

The speaker 23 is capable of outputting sound. The speaker 23 may be configured to include any number of speakers.

The display 24 is capable of displaying data. The display 24 is, for example, configured by a display or the like. The display is, for example, a liquid crystal display (LCD), an organic electro-luminescent (EL) display, or the like.

The imager 25 is capable of imaging subjects to generate captured images. The imager 25 is, for example, a visible light camera. The imager 25 continuously images subjects at any appropriate frame rate, for example. The captured image is a color image (RGB image). The captured image may, however, be a monochrome image.

The memory 26 is configured to include at least one semiconductor memory, at least one magnetic memory, at least one optical memory, or a combination of at least two of these. The semiconductor memory is, for example, RAM, ROM, or the like. The RAM is, for example, SRAM, DRAM, or the like. The ROM is, for example, EEPROM or the like. The memory 26 may function as a main memory, an auxiliary memory, or a cache memory. The memory 26 stores data to be used for operations of the terminal apparatus 20 and data obtained by the operations of the terminal apparatus 20. For example, the memory 26 stores the data of the captured image of the user of at least one terminal apparatus 20 that communicates with the apparatus containing the memory 26.

The controller 27 is configured to include at least one processor, at least one dedicated circuit, or a combination thereof. The processor is a general purpose processor such as a CPU or a GPU or a dedicated processor that is dedicated to specific processing. The dedicated circuit is, for example, an FPGA, an ASIC, or the like. The controller 27 executes processes related to the operations of the terminal apparatus 20 while controlling the components of the terminal apparatus 20.

(Operations of First Terminal Apparatus)

Figure 5:
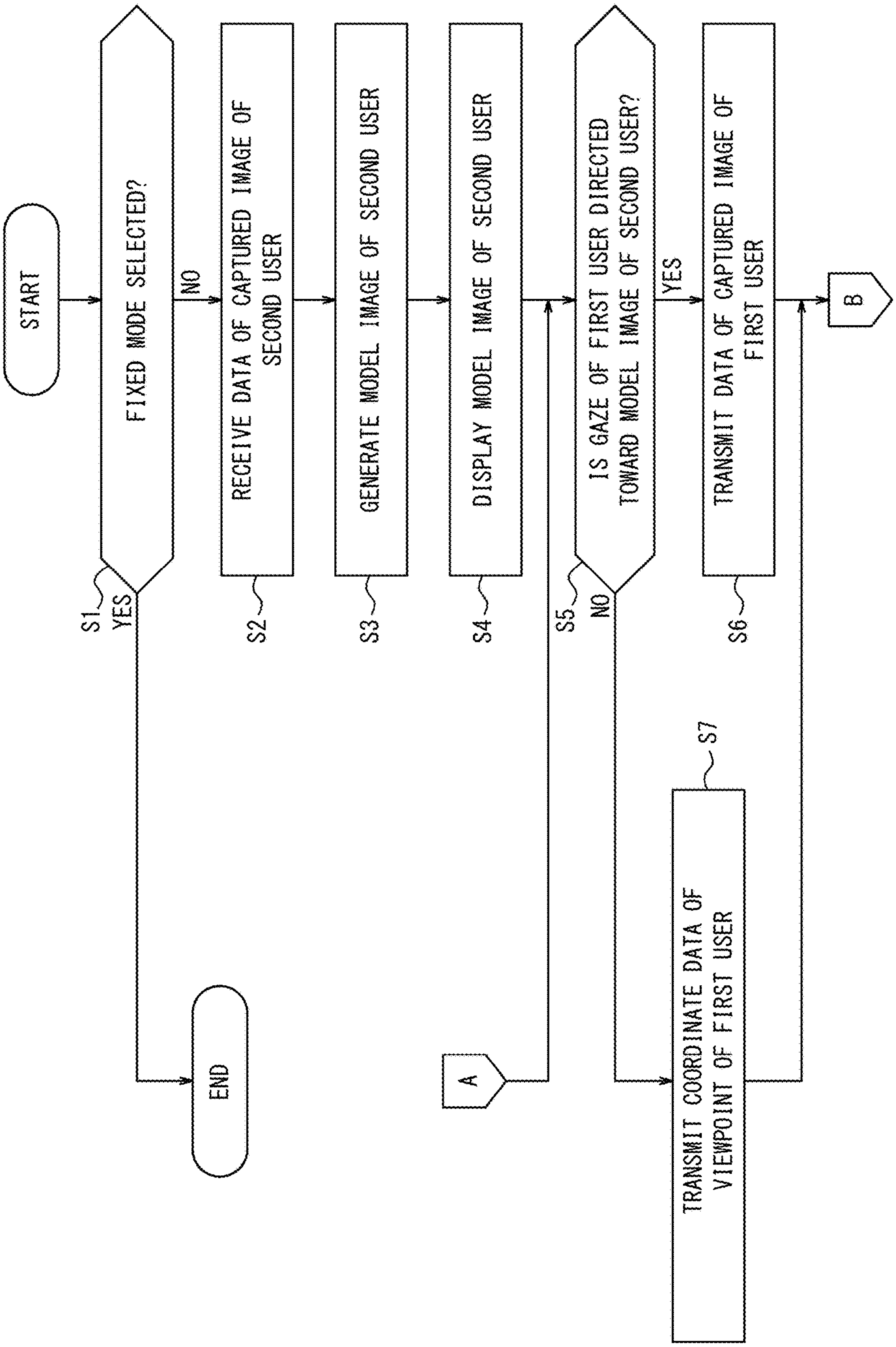
FIG. 5 is a flowchart illustrating example operations of a first terminal apparatus.

FIG. 5 is a flowchart illustrating example operations of the first terminal apparatus. The controller 27 of the first terminal apparatus starts the process in S1 when, for example, an event is held. The first terminal apparatus may transmit and receive voice data of the user to and from the second terminal apparatus in parallel with the processes below.

The controller 27 determines whether fixed mode is selected (S1). In a case in which the first user is a fixed user, the fixed mode is selected on the first terminal apparatus. In a case in which it is determined that the fixed mode is selected (S1: YES), the controller 27 ends the process illustrated in FIG. 5. Conversely, in a case in which it is determined that the fixed mode is not selected (S1: NO), the controller 27 proceeds to the process in S2.

In the process in step S2, the controller 27 controls the communication interface 21 to receive the data of the captured image of the second user from the second terminal apparatus via the network 2 and the server apparatus 10. The controller 27 may store the received data of the captured image of the second user in the memory 26. The data of the captured image of the second user stored in the memory 26 may be used when the first terminal apparatus executes the process in S13 below as the second terminal apparatus.

In the process in S3, the controller 27 generates a model image of the second user based on the data of the captured image of the second user received in the process in S2. For example, the controller 27 generates a model image of the second user by extracting an image of the head and neck of the second user from the data of the captured image of the second user.

In the process in S4, the controller 27 displays the model image of the second user generated in the process in S3 on the display 24.

In the process in S5, the controller 27 determines whether the gaze of the first user is directed toward the model image of the second user displayed on the display 24. For example, as described above, assume that in FIG. 2, the terminal apparatus 20B is the first terminal apparatus, and the model image of the second user is the model image 4C of the user 3C. In this case, the controller 27 of the terminal apparatus 20B determines whether the gaze of the user 3B is directed toward the model image 4C.

As an example of the process in S5, first, the controller 27 uses the imager 25 to generate a captured image of the first user facing the display 24. The controller 27 analyzes the generated captured image of the first user and recognizes at least one of the right eye and left eye positions and the black eye rotation angle of the first user. The controller 27 detects the position at which the right eye gaze and left eye gaze of the first user intersect by recognizing at least one of the right eye and left eye positions and the black eye rotation angle of the first user. The position at which the right eye gaze and the left eye gaze of the first user intersect corresponds to the position of the thing at which the first user is looking, i.e., the position on which the gaze of the first user is focused. The controller 27 detects the position at which the right eye gaze and the left eye gaze of the first user intersect as the position of the first user's viewpoint. Based on the detected position of the first user's viewpoint, the controller 27 determines whether the gaze of the first user is directed toward the model image of the second user displayed on the display 24. Here, the first user's viewpoint is also referred to as the first user's focal point. In general, the depth of field varies depending on the user. Therefore, there may be a misalignment in the focal point depending on the user. This misalignment may be allowable in the S5 process.

In a case in which it is determined that the gaze of the first user is directed toward the model image of the second user displayed on the display 24 (S5: YES), the controller 27 proceeds to the process in S6. In a case in which it is determined that the gaze of the first user is not directed toward the model image of the second user displayed on the display 24 (S5: NO), the controller 27 proceeds to the process in S7.

In the process in S6, the controller 27 controls the imager 25 to generate a captured image of the first user facing the display 24. The controller 27 controls the communication interface 21 to transmit the generated data of the captured image of the first user to the server apparatus 10 via the network 2. The data of the captured image of the first user is transmitted to the second terminal apparatus via the server apparatus 10.

In the process in S7, the controller 27 generates coordinate data of the viewpoint of the first user. The coordinates of the viewpoint of the first user may be the coordinates in a coordinate system based on the position of the display 24. The controller 27 may generate the coordinate data of the viewpoint of the first user by detecting the position of the viewpoint of the first user as described above. The controller 27 controls the communication interface 21 to transmit the generated coordinate data of the viewpoint of the first user to the server apparatus 10 via the network 2. The coordinate data of the viewpoint of the first user is transmitted to the second terminal apparatus via the server apparatus 10.

In the processes in S6 and S7, the controller 27 controls the communication interface 21 to transmit data of the display image displayed on the display 24 of the first terminal apparatus to the server apparatus 10 via the network 2 in addition to the data described above. The data of the display image of the first terminal apparatus is transmitted to the second terminal apparatus via the server apparatus 10. Here, the display image of the first terminal apparatus is the image seen by the first user. For example, in a case in which the first user is user 3B in FIG. 2, the display image of the first terminal apparatus is the image displayed on the display 24 of the terminal apparatus 20B. The second terminal apparatus determines the positions and the like of the plurality of user model images on the display 24 by using the data of the display image of the first terminal apparatus, as described below.

After the process in S6 or S7, the controller 27 may set another terminal apparatus 20 as the second terminal apparatus and execute the processes starting from S2. Alternatively, the controller 27 may proceed to the process in S12 illustrated in FIG. 6 below, designating the apparatus that contains the controller 27 as the second terminal apparatus and designating the user of this apparatus as the second user.

(Operations of Second Terminal Apparatus)

Figure 6:
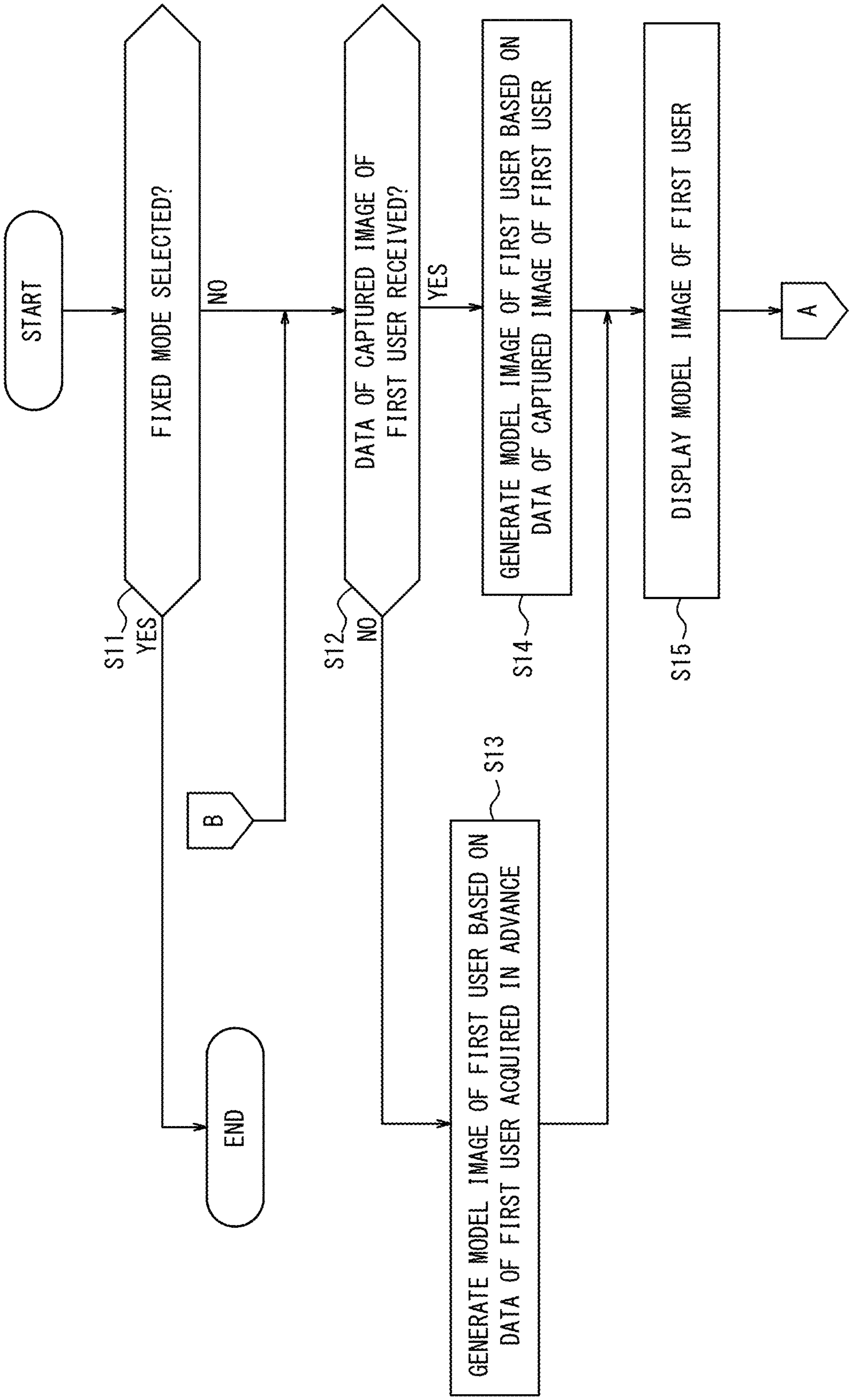
FIG. 6 is a flowchart illustrating example operations of a second terminal apparatus.

FIG. 6 is a flowchart illustrating example operations of the second terminal apparatus. The controller 27 of the second terminal apparatus starts the process in S11 when, for example, an event is held. The second terminal apparatus may transmit and receive voice data of the user to and from the first terminal apparatus in parallel with the processes below.

The controller 27 determines whether the fixed mode is selected (S11). In a case in which it is determined that the fixed mode is selected (S11: YES), the controller 27 ends the process illustrated in FIG. 6. Conversely, in a case in which it is determined that the fixed mode is not selected (S11: NO), the controller 27 proceeds to the process in S12.

In the process in S12, the controller 27 determines whether data of the captured image of the first user or coordinate data of the viewpoint of the first user has been received from the first terminal apparatus via the network 2 and the server apparatus 10. In a case in which the process in S6 has been executed by the first terminal apparatus, the controller 27 determines that the data of the captured image of the first user has been received from the first terminal apparatus (S12: YES). In a case in which the process in S7 has been executed by the first terminal apparatus, the controller 27 determines that the coordinate data of the viewpoint of the first user has been received from the first terminal apparatus (S12: NO).

In a case in which it is determined that the coordinate data of the viewpoint of the first user has been received from the first terminal apparatus (S12: NO), the controller 27 proceeds to S13. Conversely, in a case in which it is determined that the captured image of the first user has been received from the first terminal apparatus (S12: YES), the controller 27 proceeds to S14.

In the process in step S12, the controller 27 controls the communication interface 21 to receive the data of the display image of the first terminal apparatus from the first terminal apparatus via the network 2 and the server apparatus 10 in addition to the determination process described above.

In the process in S13, the controller 27 generates a model image of the first user based on data of the second user acquired in advance. The data of the first user acquired in advance is, for example, data of a captured image of the user (first user) received in advance in the process in S2 executed by the second terminal apparatus as the first terminal apparatus. The controller 27 may generate an image including the head of the first user as the model image of the first user based on the coordinate data of the viewpoint of the first user received in the process in step S12 and the data of the captured image of the first user received in advance. As an example of this process, based on the coordinate data of the viewpoint of the first user, the controller 27 first identifies the direction in which the first user, displayed on the display 24, is looking as viewed from the second user facing the display 24. Furthermore, by performing image processing and the like on the data of the captured image of the first user received in advance, the controller 27 generates an image of the head such that the displayed face of the first user is facing the direction in which the first user is looking, as viewed from the second user facing the display 24. Here, in a case in which it was determined that the gaze of the first user is not directed toward the model image of the second user (S5: NO), the process in S13 is executed. Therefore, the generated image of the head with the face of the first user facing the direction in which the first user is looking becomes an image of the back of the head or the side of the face of the first user. For example, assume that in FIG. 3, the second user facing the display 24 is the user 3C, the first user is the user 3D, and the process in S13 is executed. In this case, as illustrated in FIG. 3, the model image of the user 3D, who is the first user, as viewed from the user 3C, who is the second user facing the display 24, becomes the model image 4D that includes the back of the head. Here, images of the back of the head or the side of the face of the user are generally less complex than images of the user's face. Therefore, images of the back of the head or the side of the face of the user can easily be generated from other images.

In the process in S14, the controller 27 generates a model image of the first user based on the data of the captured image of the first user received in the process in S12. For example, the controller 27 generates a model image of the first user by extracting an image of the head and neck of the first user from the data of the captured image of the first user. Here, in a case in which it was determined that the gaze of the first user is directed toward the model image of the second user (S5: YES), the process in S14 is executed. Therefore, the model image of the first user generated from the captured image of the first user becomes an image in which the face of the first user displayed on the display 24 faces the second user facing the display 24. For example, the model image of the first user becomes an image such as the model image 4B illustrated in FIG. 3.

In the process in S15, the controller 27 displays the model image of the first user generated in the process in S13 or S14 on the display 24. The controller 27 may display the model image of the first user on the display 24 by combining the generated model image of the first user with the display image currently being displayed on the display 24. The controller 27 may determine the positions and the like of the model images of a plurality of users on the display 24 based on the data of the display image of the first terminal apparatus received in the process in S12. The controller 27 may combine the generated model image of the first user with the display image of the first terminal apparatus received in the process in S12 and display the result on the display 24.

In the process in S15, the controller 27 may adjust the perspective of the model image of the first user based on data on the distance from the display 24 to the second user. As an example of adjustment of the perspective, the controller 27 may increase the size of the model image of the first user displayed on the display 24 when the distance from the display 24 to the second user is long as compared to when the distance from the display 24 to the second user is short. The controller 27 may decrease the size of the model image of the first user displayed on the display 24 when the distance from the display 24 to the second user is short as compared to when the distance from the display 24 to the second user is long. The controller 27 may measure the distance from the display 24 to the second user based on the data of the captured image of the second user generated by the imager 25, the position of the display 24, and the position of the imager 25. The position of the display 24 and the position of the imager 25 may be acquired in advance and stored in the memory 26.

After the process in S15, the controller 27 may proceed to the process in S5, designating the apparatus that contains the controller 27 as the first terminal apparatus and the user of this apparatus as the first user. In the process in S5, the controller 27 may set the model image of the user displayed on the display 24 in the process in S15 as the model image of the second user.

In the present embodiment, the first terminal apparatus thus displays the model image of the second user on the display 24 and determines whether the gaze of the first user is directed toward the displayed model image of the second user.

In a case in which it is determined by the first terminal apparatus that the gaze of the first user is directed toward the displayed model image of the second user, the second terminal apparatus generates a model image of the first user based on a captured image of the first user received from the first terminal apparatus. For example, in FIG. 3, the terminal apparatus 20C, which is the second terminal apparatus, generates the model image 4B of the user 3B based on the captured image of the user 3B, who is the first user, as described above. This configuration can provide realistic communication, as described above.

In a case in which it is determined by the first terminal apparatus that the gaze of the first user is not directed toward the displayed model image of the second user, the second terminal apparatus generates a model image of the first user based on the data of the first user acquired in advance. For example, in FIG. 3, the terminal apparatus 20C, which is the second terminal apparatus, generates the model image 4D of the user 3C, who is the first user, as described above. The model image 4D is an image of the back of the head. As described above, images of the back of the head or the side of the face of the user can easily be generated from other images. Furthermore, in a case in which the gaze of the first user is not directed toward the displayed model image of the second user, the first user and the second user are not communicating. Therefore, displaying an image of the back of the head of the first user on the second terminal apparatus does not interfere with communication between the first user and the second user. Also, since the first terminal apparatus need not transmit the captured image of the first user to the second terminal apparatus, the amount of communication between the terminal apparatuses 20 can be reduced. The reduction in the amount of communication between the terminal apparatuses 20 can suppress a reduction in communication speed.

According to the present embodiment, realistic communication can therefore be provided while a reduction in communication speed is suppressed.

While the present disclosure has been described with reference to the drawings and examples, it should be noted that various modifications and revisions may be implemented by those skilled in the art based on the present disclosure. Accordingly, such modifications and revisions are included within the scope of the present disclosure. For example, functions or the like included in each component, each step, or the like can be rearranged without logical inconsistency, and a plurality of components, steps, or the like can be combined into one or divided.

For example, in the embodiment described above, the processing content of S3 and S4 may be the same as or similar to the processing content of S14 and S15.

For example, in the above embodiment, the data of the first user acquired in advance has been described as being data of a captured image of the user (first user) received in advance in the process in S2 executed by the second terminal apparatus as the first terminal apparatus. The data of the captured image of the first user received in advance is not, however, limited to the data of the captured image received in the process in S2. The data of the captured image of the first user received in advance may be data of a captured image received in a process other than S2.

For example, in the above embodiment, the controller 27 has been described as measuring the distance from the display 24 to the second user in the process in S15 based on information such as the data of the captured image of the second user generated by the imager 25. The controller 27 may, however, measure the distance from the display 24 to the second user by other methods.

For example, in a case in which the second terminal apparatus includes a distance measurement sensor, the controller 27 may use the distance measurement sensor to measure the distance from the display 24 to the second user.

Examples of some embodiments of the present disclosure are described below. However, it should be noted that the embodiments of the present disclosure are not limited to these.

[Appendix 1] An image generation method to be executed by a first terminal apparatus and a second terminal apparatus, the image generation method comprising:

displaying, by the first terminal apparatus, a model image of a second user of the second terminal apparatus and determining whether a gaze of a first user of the first terminal apparatus is directed toward the displayed model image of the second user;

generating, by the second terminal apparatus, in a case in which it is determined by the first terminal apparatus that the gaze of the first user is directed toward the displayed model image of the second user, a model image of the first user based on a captured image of the first user received from the first terminal apparatus; and generating, by the second terminal apparatus, in a case in which it is determined by the first terminal apparatus that the gaze of the first user is not directed toward the displayed model image of the second user, a model image of the first user based on data of the first user acquired in advance.

[Appendix 2] The image generation method according to appendix 1, further comprising displaying, by the second terminal apparatus, the generated model image of the first user.

[Appendix 3] The image generation method according to appendix 1 or 2, further comprising transmitting, by the first terminal apparatus, the captured image of the first user to the second terminal apparatus in a case in which it is determined that the gaze of the first user is directed toward the displayed model image of the second user.

[Appendix 4] The image generation method according to any one of appendices 1 to 3, wherein in a case in which it is determined by the first terminal apparatus that the gaze of the first user is directed toward the displayed model image of the second user, the model image of the first user generated by the second terminal apparatus is an image in which a displayed face of the first user is facing the second user, who is facing a display of the second terminal apparatus.

[Appendix 5] The image generation method according to any one of appendices 1 to 4, wherein the generating, by the second terminal apparatus, of the model image of the first user based on the data of the first user acquired in advance comprises generating the model image of the first user based on a captured image of the first user received in advance.

[Appendix 6] The image generation method according to appendix 5, further comprising transmitting, by the first terminal apparatus, coordinate data of a viewpoint of the first user to the second terminal apparatus in a case in which it is determined that the gaze of the first user is not directed toward the displayed model image of the second user.

[Appendix 7] The image generation method according to appendix 6, further comprising generating, by the second terminal apparatus, an image including a head of the first user, as the model image of the first user, based on the coordinate data of the viewpoint of the first user received from the first terminal apparatus and the captured image of the first user received in advance.

[Appendix 8] The image generation method according to appendix 7, wherein the image of the head of the first user is an image in which a displayed face of the first user is facing a direction in which the first user is looking, as viewed from a second user facing a display of the second terminal apparatus.

[Appendix 9] The image generation method according to appendix 8, wherein the image of the head of the first user is an image of a back of the head or an image of a side of the face of the first user.

[Appendix 10] The image generation method according to any one of appendices 1 to 9, further comprising adjusting, by the second terminal apparatus, a perspective of the model image of the first user based on a distance from a display of the second terminal apparatus to the second user when the model image of the first user is displayed.

[Appendix 11]A system comprising:

a first terminal apparatus and a second terminal apparatus, wherein the first terminal apparatus is configured to display a model image of a second user of the second terminal apparatus and determine whether a gaze of a first user of the first terminal apparatus is directed toward the displayed model image of the second user, the second terminal apparatus is configured to generate, in a case in which it is determined by the first terminal apparatus that the gaze of the first user is directed toward the displayed model image of the second user, a model image of the first user based on a captured image of the first user received from the first terminal apparatus, and the second terminal apparatus is configured to generate, in a case in which it is determined by the first terminal apparatus that the gaze of the first user is not directed toward the displayed model image of the second user, a model image of the first user based on data of the first user acquired in advance.

[Appendix 12] The system according to appendix 11, wherein the second terminal apparatus is configured to display the generated model image of the first user.

[Appendix 13] The system according to appendix 11 or 12, wherein the first terminal apparatus is configured to transmit the captured image of the first user to the second terminal apparatus in a case in which it is determined that the gaze of the first user is directed toward the displayed model image of the second user.

[Appendix 14] The system according to any one of appendices 11 to 13, wherein in a case in which it is determined by the first terminal apparatus that the gaze of the first user is directed toward the displayed model image of the second user, the model image of the first user generated by the second terminal apparatus is an image in which a displayed face of the first user is facing the second user, who is facing a display of the second terminal apparatus.

[Appendix 15] The system according to any one of appendices 11 to 14, wherein the second terminal apparatus is configured to generate the model image of the first user based on a captured image of the first user received in advance as the data on the first user acquired in advance.

[Appendix 16] The system according to appendix 15, wherein the first terminal apparatus is configured to transmit coordinate data of a viewpoint of the first user to the second terminal apparatus in a case in which it is determined that the gaze of the first user is not directed toward the displayed model image of the second user.

[Appendix 17] The system according to appendix 16, wherein the second terminal apparatus is configured to generate an image including a head of the first user, as the model image of the first user, based on the coordinate data of the viewpoint of the first user received from the first terminal apparatus and the captured image of the first user received in advance.

[Appendix 18] The system according to appendix 17, wherein the image of the head of the first user is an image in which a displayed face of the first user is facing a direction in which the first user is looking, as viewed from a second user facing a display of the second terminal apparatus.

[Appendix 19] The system according to appendix 18, wherein the image of the head of the first user is an image of a back of the head or an image of a side of the face of the first user.

[Appendix 20] The system according to any one of appendices 11 to 19, wherein the second terminal apparatus is configured to adjust a perspective of the model image of the first user based on a distance from a display of the second terminal apparatus to the second user when the model image of the first user is displayed.

The invention claimed is:

1. An image generation method to be executed by a first terminal apparatus and a second terminal apparatus, the image generation method comprising:

displaying, by the first terminal apparatus, a model image of a second user of the second terminal apparatus and determining whether a gaze of a first user of the first terminal apparatus is directed toward the displayed model image of the second user;

generating, by the second terminal apparatus, in a case in which it is determined by the first terminal apparatus that the gaze of the first user is directed toward the displayed model image of the second user, a model image of the first user based on a captured image of the first user received from the first terminal apparatus;

generating, by the second terminal apparatus, in a case in which it is determined by the first terminal apparatus that the gaze of the first user is not directed toward the displayed model image of the second user, a model image of the first user based on data of the first user acquired in advance;

receiving, by the second terminal apparatus, coordinate data of a viewpoint of the first user from the first terminal apparatus in a case in which it is determined by the first terminal apparatus that the gaze of the first user is not directed toward the displayed model image of the second user;

generating, by the second terminal apparatus, an image including a head of the first user, as the model image of the first user, based on the coordinate data of the viewpoint of the first user received from the first terminal apparatus and a captured image of the first user received in advance; and adjusting, by the second terminal apparatus, a perspective of the model image of the first user based on a distance from a display of the second terminal apparatus to the second user when the model image of the first user is displayed.

2. The image generation method according to claim 1, further comprising displaying, by the second terminal apparatus, the generated model image of the first user.

3. The image generation method according to claim 1, further comprising transmitting, by the first terminal apparatus, the captured image of the first user to the second terminal apparatus in a case in which it is determined that the gaze of the first user is directed toward the displayed model image of the second user.

4. The image generation method according to claim 3, wherein in a case in which it is determined by the first terminal apparatus that the gaze of the first user is directed toward the displayed model image of the second user, the model image of the first user generated by the second terminal apparatus is an image in which a displayed face of the first user is facing the second user, who is facing a display of the second terminal apparatus.

5. The image generation method according to claim 1, wherein the generating, by the second terminal apparatus, of the model image of the first user based on the data of the first user acquired in advance comprises generating the model image of the first user based on a captured image of the first user received in advance.

6. The image generation method according to claim 1, wherein the image of the head of the first user is an image in which a displayed face of the first user is facing a direction in which the first user is looking, as viewed from a second user facing a display of the second terminal apparatus.

7. The image generation method according to claim 6, wherein the image of the head of the first user is an image of a back of the head or an image of a side of the face of the first user.

8. The image generation method according to claim 7, wherein the image of the head of the first user is an image in which a displayed face of the first user is facing a direction in which the first user is looking, as viewed from a second user facing a display of the second terminal apparatus.

9. The image generation method according to claim 8, wherein the image of the head of the first user is an image of a back of the head or an image of a side of the face of the first user.

10. A system comprising:

a first terminal apparatus and a second terminal apparatus, wherein the first terminal apparatus is configured to display a model image of a second user of the second terminal apparatus and determine whether a gaze of a first user of the first terminal apparatus is directed toward the displayed model image of the second user, the second terminal apparatus is configured to generate, in a case in which it is determined by the first terminal apparatus that the gaze of the first user is directed toward the displayed model image of the second user, a model image of the first user based on a captured image of the first user received from the first terminal apparatus, the second terminal apparatus is configured to generate, in a case in which it is determined by the first terminal apparatus that the gaze of the first user is not directed toward the displayed model image of the second user, a model image of the first user based on data of the first user acquired in advance, the second terminal apparatus is configured to receive coordinate data of a viewpoint of the first user from the first terminal apparatus in a case in which it is determined by the first terminal apparatus that the gaze of the first user is not directed toward the displayed model image of the second user, the second terminal apparatus is configured to generate an image including a head of the first user, as the model image of the first user, based on the coordinate data of the viewpoint of the first user received from the first terminal apparatus and a captured image of the first user received in advance, and the second terminal apparatus is configured to adjust a perspective of the model image of the first user based on a distance from a display of the second terminal apparatus to the second user when the model image of the first user is displayed.

11. The system according to claim 10, wherein the second terminal apparatus is configured to display the generated model image of the first user.

12. The system according to claim 10, wherein the first terminal apparatus is configured to transmit the captured image of the first user to the second terminal apparatus in a case in which it is determined that the gaze of the first user is directed toward the displayed model image of the second user.

13. The system according to claim 12, wherein in a case in which it is determined by the first terminal apparatus that the gaze of the first user is directed toward the displayed model image of the second user, the model image of the first user generated by the second terminal apparatus is an image in which a displayed face of the first user is facing the second user, who is facing a display of the second terminal apparatus.

14. The system according to claim 10, wherein the second terminal apparatus is configured to generate the model image of the first user based on a captured image of the first user received in advance as the data on the first user acquired in advance.

15. The system according to claim 11, wherein the image of the head of the first user is an image in which a displayed face of the first user is facing a direction in which the first user is looking, as viewed from a second user facing a display of the second terminal apparatus.

16. The system according to claim 15, wherein the image of the head of the first user is an image of a back of the head or an image of a side of the face of the first user.

17. The system according to claim 16, wherein the image of the head of the first user is an image in which a displayed face of the first user is facing a direction in which the first user is looking, as viewed from a second user facing a display of the second terminal apparatus.

18. The system according to claim 17, wherein the image of the head of the first user is an image of a back of the head or an image of a side of the face of the first user.

19. An image generation method to be executed by a first terminal apparatus and a second terminal apparatus, the image generation method comprising:

displaying, by the first terminal apparatus, a model image of a second user of the second terminal apparatus and determining whether a gaze of a first user of the first terminal apparatus is directed toward the displayed model image of the second user;

generating, by the second terminal apparatus, in a case in which it is determined by the first terminal apparatus that the gaze of the first user is directed toward the displayed model image of the second user, a model image of the first user based on a captured image of the first user received from the first terminal apparatus; and generating, by the second terminal apparatus, in a case in which it is determined by the first terminal apparatus that the gaze of the first user is not directed toward the displayed model image of the second user, a predetermined model image of the first user based on data of the first user acquired in advance, wherein the predetermined model image is free of elements representing eyes of the first user.

20. The method according to claim 19, further comprising adjusting, by the second terminal apparatus, a perspective of the model image of the first user based on a distance from a display of the second terminal apparatus to the second user when the model image of the first user is displayed.

* * * * *